Nov. 9, 1954
F. HELBERG
2,693,723
TORQUE CONVERTER
Filed Jan. 27, 1950
2 Sheets—Sheet 1
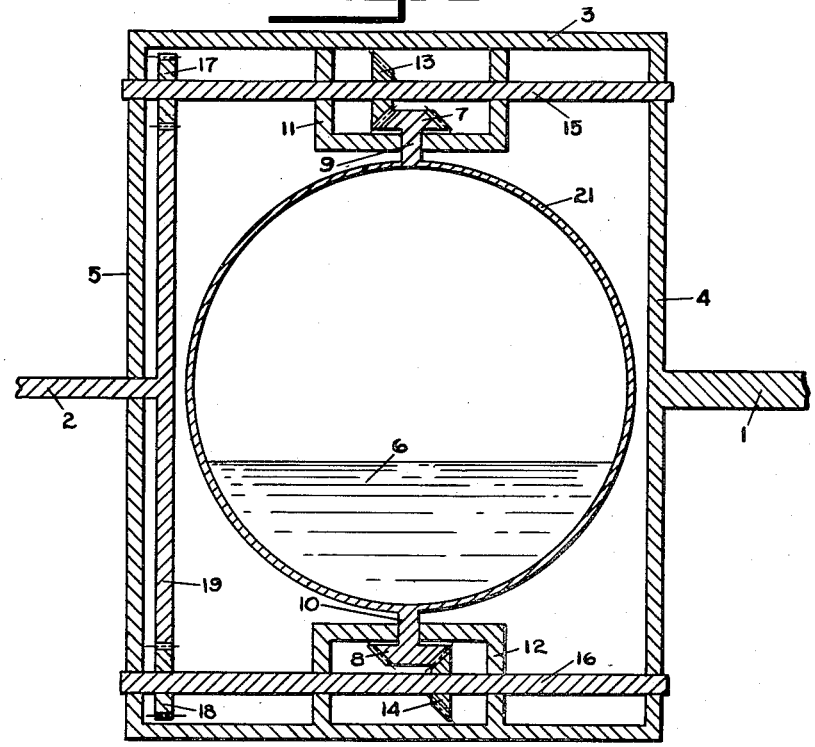
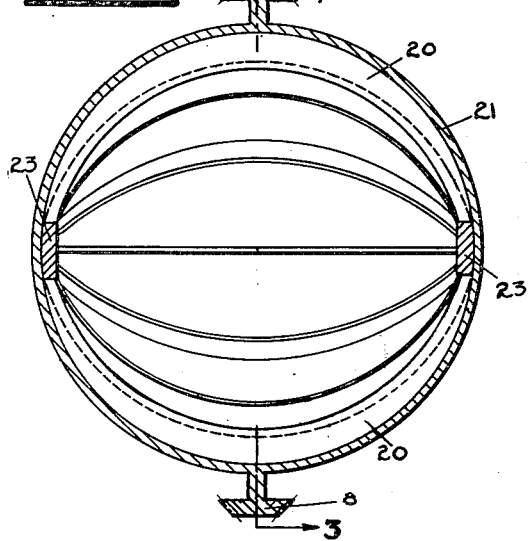
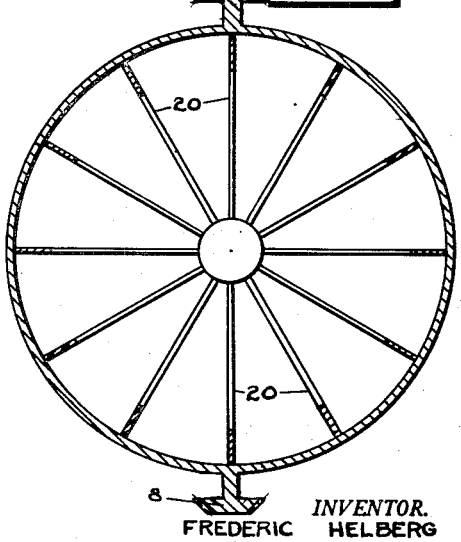
INVENTOR.
FREDERIC HELBERG
BY
ATTORNEYS Nov. 9, 1954 F. HELBERG 2,693,723
TORQUE CONVERTER
Filed Jan. 27, 1950 2 Sheets-Sheet 2
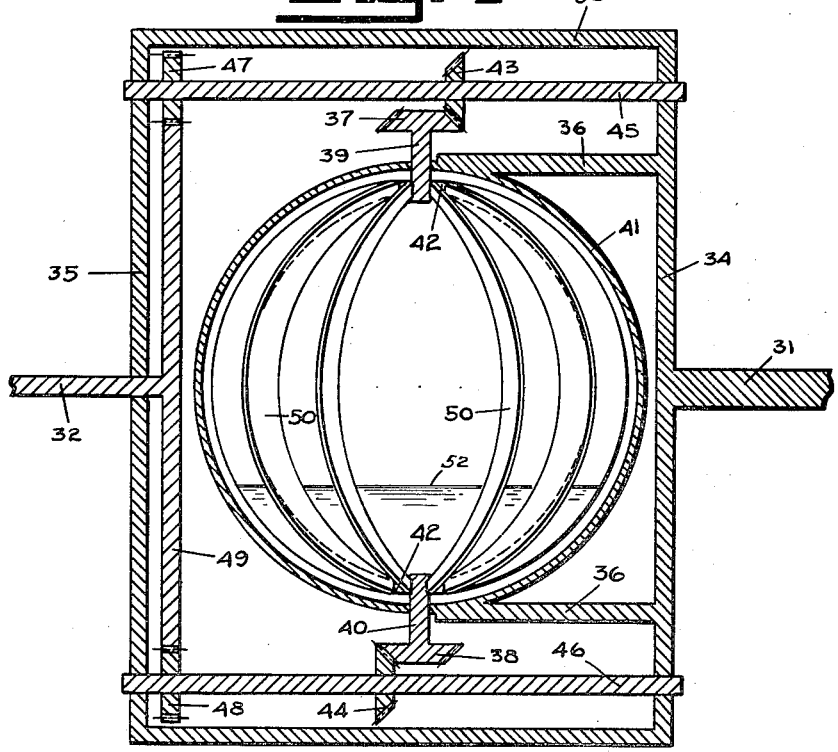
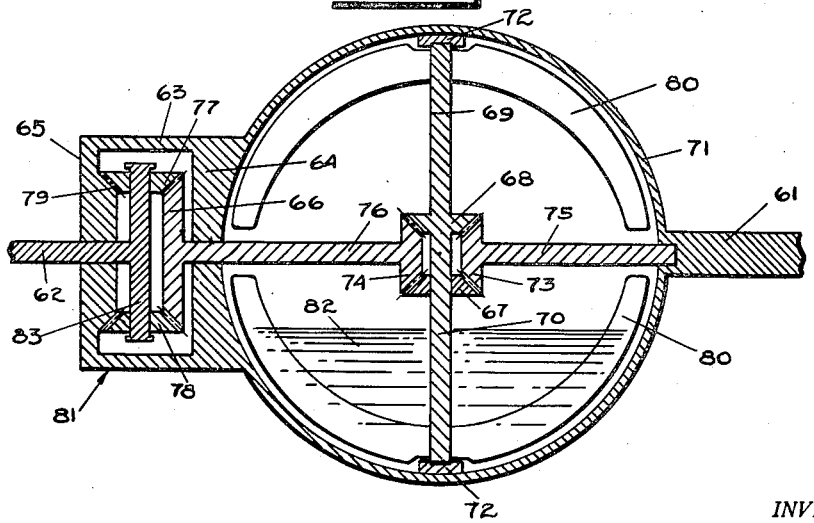
INVENTOR.
FREDERIC HELBERG
BY
Boyken, Mohler & Beckley
ATTORNEYS 12,693,723
Patented Nov. 9, 1954

2,693,723

TORQUE CONVERTER

Frederic Helberg, Oakland, Calif.

Application January 27, 1950, Serial No. 140,834

2 Claims. (Cl. 74—751)

This invention relates to torque convertors and more particularly to an automatic transmission which is adapted to transmit power from a driving shaft to a driven shaft so that the torque impressed upon the latter is proportional to the resistance offered by the same.

Automatic hydraulic transmissions which automatically select the gear ratio desired for particular loads and speeds are well known and are now in use in commercial vehicles. These transmissions do not permit the use of progressively changing speed-torque ratios for any torque desired on the driven shaft but for the most part select stages of speed-torque ratios by automatic shifting of transmission gearing depending on the load to be driven.

These prior art devices are disadvantageous from the standpoint of cost and maintenance because of the complexity of the machinery involved. For the most part, these devices involve the use of pumps, turbines, brakes and clutches which of necessity must be machined to great precision.

One of the objects of this invention is the provision of an automatic torque convertor which eliminates the disadvantages of these prior art devices.

Another object of the invention is the provision of a simple torque converting means which permits delivery of progressively increasing or decreasing torque to the driven shaft depending upon the resistance offered by such shaft and without the use of stages or predetermined gear ratios.

Still another object of the invention is the provision of a simple torque convertor which automatically provides the correct gear ratio between the driving and driven shafts to meet the entire range of load conditions without the necessity of gear changing of any sort.

And yet another object of the invention is the provision of an automatic torque convertor in which the loss due to friction is minimized to provide relatively high efficiency.

Another object of the invention is the provision of an automatic torque convertor which includes a fluid coupling for effecting a smooth transfer of power during conditions of changing load.

Other objects and advantages will be seen from the drawings and description.

The drawings are all semi-schematic, and in said drawings Fig. 1 is a sectional view through a torque convertor illustrating one form of the invention.

Fig. 2 is a sectional view of the gyroscopic element of Fig. 1 only showing modified form of the same.

Fig. 3 is a sectional view of the gyroscopic element of Fig. 2 as taken along the lines 3—3 of Fig. 2.

Fig. 4 is a sectional view through a torque convertor that structually differs slightly from that of Figs. 1 and 2.

Fig. 5 is a sectional view through a torque convertor showing a modified form of the torque convertors shown in the preceding views.

Generally stated, the invention contemplates the use of a fluid gyroscopic weight for automatically regulating the torque transmitted to the driven shaft. Such a gyrostatic fluid has not, to my knowledge been employed heretofore for such a purpose. Rotating weights purporting to function gyroscopically have heretofore, for the most part, been actually employed as simple inertia elements. Although the inertia of rotating masses is the basis for gyroscopic action, the term "gyroscopic" is properly employed only when the phenomenon of precession characterizes the action. The term will be used hereinafter as having this meaning.

In detail, referring to Fig. 1, the device shown therein comprises a pair of coaxial shafts 1, 2, the former being the drive shaft and the latter the driven shaft.

Drive shaft 1 may be rigid with end wall 4 of a housing having cylindrical sidewalls 3 and an opposite endwall 5.

Within said housing is a hollow spherical container 21 which is adapted to contain a liquid 6 shown in Fig. 1 at rest with the convertor not running. A pair of coaxial shafts 9, 10 extend outwardly of container 21 at opposite ends thereof and respectively carry bevel gears 7, 8. The shafts 9, 10 are journalled in supports 11, 12 which in turn are rigidly secured to the cylindrical sidewalls 3 of the housing.

Meshing with bevel gears 7, 8 are corresponding bevel gears 13, 14 respectively, which in turn are fastened to shafts 15, 16 rotatably secured at their ends to end walls 4 and 5 of the housing. Pinions 17, 18 are also fastened to the shafts 15, 16 preferably adjacent the end wall 5 which is remote from the drive shaft 1. The pinions 17, 18 both mesh with a relatively large spur gear 19 which is mounted on output shaft 2. The output shaft 2 is journalled in the end wall 5 centrally of the same.

The above described mechanism is symmetrical about the common axis of drive shaft 1 and driven shaft 2 except that bevel gear 13 is on the opposite side of container 21 from the bevel gear 14, this arrangement being necessary to permit both of the bevel gears 13, 14 to drive element 21 in one direction.

In operation, upon rotating the drive shaft 1, the spherical container 21 will spin with the housing and will throw the liquid 6 radially outwardly from the center of the sphere.

If no load is on the output shaft 2, the liquid will be disposed peripherally around the inside of the container and substantially in a plane perpendicular to the axis of the input and output shafts. The pinions 17, 18 will exert a tangential force on the spur gear 19 to rotate the spur gear, thus driving the driven shaft. In this case, little rotation, if any, will take place in the pinions 17, 18 about their own axis which coincide with the axes of shafts 15, 16 respectively.

If a load is now placed on the driven shaft 2, the spur gear 19 will tend to resist its rotation by the pinions 17 and 18 thus causing the pinions to rotate on their own axes since these pinions must revolve around the axis of the drive shaft with the housing. The rotation of pinions 17, 18 will impart rotation to the spherical container 21 about the shafts 9, 10 at a speed which will depend upon the gear ratio between the gear 19 and the bevel gears 7 and 8.

Upon rotation of the spherical container 21, the liquid contained therein will seek a position most remote from the axis of said element or in other words, it will tend to rotate through 90° from the previous position. The mass of liquid during spinning may be imagined as the rim of a spinning gyroscopic wheel.

It will be apparent that when a load is placed on the output shaft 2, the spherical container 21 will rotate around the axis of shafts 9 and 10 and will also rotate with the housing around the axis of shafts 1 and 2.

Both of these actions will in effect take place at the same time but instead of resulting in turbulence, the liquid will be made to precess because of the combination of forces at right angles to each other. This result is in accordance with the well known characteristics of gyroscopic action.

The result to the above described action is to cause a reaction on the gear train which increases the torque impressed on the output shaft. It will be apparent that the greater the load on the output shaft the greater will be the torque applied to the driven shaft.

Figs. 2 and 3 illustrate a modification of the container 21 wherein a plurality of vanes 20 are shown secured to the inner wall of the sphere at spaced points around the same, and secured at their ends to bosses 23 secured to sphere 21. These vanes are preferably circular segments having a common axis coinciding with the axis of the shafts 1 and 2, and may be welded along the inner periphery of the element 21. The vanes 20 may be employed as shown in Figs. 2 and 3 depending upon the characteristics of the fluid 6 contained in the container 21. It will be apparent that these vanes effect a more positive movement of the liquid rim during rotation of the mechanism when the liquid is acted upon by the centrifugal force associated with spinning about the axis of the shafts 9 and 10. The vanes also minimize turbulence which might occur under some circumstances when a sudden change in load is encountered.

Fig. 4 illustrates a modified form of the invention incorporating a different structure from that shown in Figs. 1–3 but employing a similar principle.

The spherical container 41 of Fig. 4 is rigidly secured to the endwall 34 of the housing by means of supports 36 and does not spin except with the housing. Within the sphere 41 are a plurality of vanes 50 which are similar in shape to the vanes 20 of Figs. 2 and 3 but which are connected at their ends to disks 42 which in turn are secured to shafts 39 and 40. The shafts 39 and 40 carry bevel gears 37, 38 which in turn mesh with corresponding bevel gears 43, 44 respectively which in turn are fastened to shafts 45, 46 respectively. The shafts 45, 46 are rotatably supported at their ends in end walls 34 and 35 and carry pinions 47, 48 meshing with a relatively large spur gear 49 carried by the driven shaft 32. The driven shaft 32 is journalled in end wall 35. The shafts 39, 40 to which the vanes 50 are secured are journalled in the container 41 at opposite ends thereof.

Upon rotation of the drive shaft 31 which is rigidly secured to end wall 34, the liquid 52 within the sphere 41 will seek a position most remote from the axis of the shafts 31, 32, that is, the liquid will form a rim in a plane perpendicular to the axis of the shafts. Upon rotation of the vanes 50 due to loading of driven shaft 32, the liquid will tend to move into a plane perpendicular to the axis of the shafts 39 and 40 due to the action of the vanes 50. Thus it is seen that the action, insofar as the movement of the liquid is concerned is identical to that formerly described in connection with the first embodiment.

In Fig. 5 is illustrated another modification of the invention which has the advantage of greater compactness over those shown in Figs. 1–4. A spherical container 71 is secured to the drive shaft 61 for rotation therewith and has secured to its side opposite the drive shaft a housing generally designated 81 adapted to support the necessary gearing. This housing comprises cylindrical side walls 63, an end wall 65 and an intermediate wall 64. Vanes 80, which are similar in shape to the vanes previously described, are supported on shafts 69, 70 for rotation about an axis perpendicular to the axis of the drive shaft 61 and the driven shaft 62. A bevel gear 68 is rigidly supported on shaft 69 and gear 67 is merely an idler rotatable on shaft 70. The shafts 69, and 70 may be extended radially inwardly of the sphere and connected to form a single shaft which in turn is rotatably supported at its ends in bosses 72 secured to the walls of the sphere 71. In mesh with gears 67, 68 is a bevel gear 74 secured to shaft 76 which is coaxial with the shafts 61, 62 and supported for rotation in wall 64 of housing 81. Also in mesh with gears 67, 68 is a bevel gear 73 which is merely an idler and fastened to shaft 75 which is in alignment with shaft 76. This shaft 75 may be supported for rotation in shaft 61 as shown in Fig. 5.

Within housing 81 is a bevel gear 66 secured to the outer end of shaft 76 and with which differential pinions 77, 78 are in mesh. These differential pinions are coaxial and supported for rotation on shaft 83 which in turn is secured at right angles to driven shaft 62. A differential gear 79 rigidly secured to end wall 65 of housing 81 completes the differential gear form within the housing 81.

Referring to Fig. 5, it will be apparent that under a "no load" condition, the differential gear 66 will be stationary and the housing will drive the shaft 62 through differential gear 79 and differential pinions 77, 78. Upon loading the shaft 62, the differential pinions 77, 78 will resist revolution about the axes of the shafts 61, 62 and will be rotated about their own axis coinciding with shaft 83 thus rotating the differential gear 66 which in turn will rotate the vanes 80 about an axis perpendicular to the axis of shaft 61. It is understood of course, that the rotation of the element 71 will have caused the liquid 82 within the container to dispose itself in a rim in a plane perpendicular to the axis of shafts 61 and 62. Upon rotation of the vanes 80 after a load is impressed upon the output shaft 62 the liquid will tend to move through 90° under the action of the vanes and a reaction similar to that described in connection with Figs. 1–4 will result thereby impressing a greater torque upon the shaft 62.

It will be apparent that in all of the embodiments of the invention herein disclosed that the reaction upon the gyroscopic elements which is transmitted to the driven shaft results from the precession of the liquid within the container and is not merely the result of the inertia of the element by virtue of its own weight.

It is pertinent to note that the present invention is, under certain conditions, a fluid clutch which transmits power through the medium of a rotating mass of liquid. This use of fluid permits a smooth transmission of power to the driven shaft and obviates sudden shocks which are always present in mechanical structures of like nature.

The operation of the gyroscopic fluid upon decreasing of the load on the driven shaft is of course the reverse of that described heretofore where it was assumed that the load was increased on the driven shaft. When the load is diminished on the driven shaft, the liquid will tend to return to a position in which it becomes disposed as a rim of a fluid wheel in a plane perpendicular to the axis of the driving and driven shafts. It is obvious that the precession attending this reverse condition results in a decrease of the torque transmitted to the driven shaft.

The present invention lends itself readily to various commercial applications which require that the power available to be converted into torques and speeds of various ratios and it is to be understood that many variations of the structure shown may be made without departing from the spirit of the invention.

The fluid employed within the container is preferably of relatively high density but as hereinbefore noted, vanes may be provided within the gyroscopic element to increase efficiency and should be positioned so as not to interfere with natural precession. It will be understood regardless of what form of the invention is employed that the liquid should only partially fill the gyroscopic element so as to take advantage of the phenomenon of precession.

I claim:

1. In combination with a driving shaft and a driven shaft, a torque convertor comprising a housing rigidly secured to said driving shaft for rotation therewith, a hollow container containing a fluid gyroscopic weight rotatably supported in said housing for rotation about an axis at right angles to the axis of said housing means for so rotating said container, a pair of gears secured to said container coaxial therewith, a pair of epicyclic gears rotatably secured to said housing and in mesh respectively with said pair of gears for orbital movement about the axis of said shafts and a gear train connecting said epicyclic gears with said driven shaft for rotating the latter.

2. Mechanism of the class described comprising an input shaft, an output shaft coaxial therewith, a frame secured to said input shaft to rotate therewith, a gyro rotor having a shaft journalled in said frame with its axis of rotation perpendicular to the axis of rotation of the input shaft and frame, two auxiliary rotatable shafts journalled in said frame, said two shafts being parallel to the axis of rotation of the frame and symmetrically arranged with respect thereto, gear connections between said auxiliary shafts and rotor for rotation of both auxiliary shafts in the same direction and at the same speed when the rotor rotates on its axis, a gear wheel mounted on said output shaft, and a pinion mounted on each auxiliary shaft and meshing with said gear wheel.

References Cited in the file of this patent

UNITED STATES PATENTS

| Number | Name | Date |
|---|---|---|
| 1,360,216 | Hunt | Nov. 23, 1920 |
| 1,914,865 | Roth | June 20, 1933 |
| 2,031,286 | Stern et al. | Feb. 18, 1936 |
| 2,052,507 | Walton | Aug. 25, 1936 |
| 2,139,301 | Davey | Dec. 6, 1938 |
| 2,453,684 | Cloete | Nov. 9, 1948 |
| 2,571,159 | Osgood | Oct. 16, 1951 |

FOREIGN PATENTS

| Number | Country | Date |
|---|---|---|
| 141,139 | Great Britain | Apr. 11, 1920 |
| 238,423 | Great Britain | Aug. 20, 1925 |
| 386,540 | Germany | Dec. 11, 1923 |
| 622,337 | Great Britain | Apr. 29, 1949 |
| 772,107 | France | Oct. 23, 1934 |